US011650167B2

(12) United States Patent
Fam et al.

(10) Patent No.: US 11,650,167 B2
(45) Date of Patent: May 16, 2023

(54) ABNORMAL SURFACE PATTERN DETECTION FOR PRODUCTION LINE DEFECT REMEDIATION

(71) Applicant: Seagate Technology LLC, Fremont, CA (US)

(72) Inventors: Yen Eng Fam, Singapore (SG); Jun Lee Kok, Singapore (SG); Bak Leng Lim, Singapore (SG); Yen Ling Lim, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 98 days.

(21) Appl. No.: 17/125,754

(22) Filed: Dec. 17, 2020

(65) Prior Publication Data

US 2022/0196571 A1 Jun. 23, 2022

(51) Int. Cl.
*G01N 21/956* (2006.01)
*G06T 7/00* (2017.01)
*G01N 21/88* (2006.01)

(52) U.S. Cl.
CPC ....... *G01N 21/956* (2013.01); *G01N 21/8806* (2013.01); *G06T 7/0004* (2013.01); *G06T 2207/30164* (2013.01)

(58) Field of Classification Search
CPC ............. G01N 21/956; G01N 21/8806; G06T 7/0004; G06T 2207/30164
See application file for complete search history.

(56) References Cited

U.S. PATENT DOCUMENTS

| 10,698,006 | B2 * | 6/2020 | Nakamura | ......... | G01R 31/2656 |
| 11,189,021 | B2 * | 11/2021 | Shah | ......... | G06T 7/60 |
| 2022/0043356 | A1 * | 2/2022 | Zhang | ......... | G03F 7/70675 |

FOREIGN PATENT DOCUMENTS

| WO | 2007023502 A2 | 3/2007 |
| WO | 2017204766 A2 | 11/2017 |

* cited by examiner

*Primary Examiner* — Hung V Nguyen
(74) *Attorney, Agent, or Firm* — Holzer Patel Drennan

(57) ABSTRACT

A defect inspection system provides an image of a surface of a hard drive media to a machine learning model that is trained to identify predefined classifications of abnormal surface patterns on the hard drive media, each of the predefined classifications being associated in system memory with a severity indicator. The defect inspection model analyzes the image and generates and output indicating that the image includes a pattern consistent with a select classification of the predefined classifications of abnormal surface patterns. When the severity indicator for the select classification satisfies a failure condition, the defect inspection system automatically implements a corrective action.

18 Claims, 7 Drawing Sheets

| Pattern ID | Severity Indicator | Likely cause of pattern | Maintenance Suggestion |
|---|---|---|---|
| Island | Severe | • Mandrel angle error<br>• Presence of foreign material in lube tank | • Verify mandrel stem and angle<br>• Check lube tank for foreign materials |
| Fang | Severe | • Thermal Shock<br>• Lube drain too fast | • Adjust/check machine temp settings<br>• Check drain speed and lube concentration |
| Multiline | Severe | • Pump malfunction<br>• Check valve malfunction<br>• Filter blockage | • Check pump and filter efficiency<br>• Inspect check valve for solution backflow |
| Dropline | Severe | • Mandrel slot pitch error<br>• Mandrel slot angle error | • Verify mandrel pitch<br>• Verify disk position on mandrel |
| Puddle | Mild | • Early trigger on fast drain | • Verify disk level and fast drain sensor position |
| Scratch | Mild | • Imager station automation/ handling damage | • Verify imager setup and laser condtion |

FIG. 3

ABNORMAL SURFACE PATTERN DETECTION FOR PRODUCTION LINE DEFECT REMEDIATION

BACKGROUND

On assembly lines, human operators are often tasked with inspecting products at various stages of manufacturing. For certain types of products, defects difficult to see identify. Consequently, human operators often make mistakes and/or apply inconsistent standards when inspecting products.

SUMMARY

A defect inspection system includes a machine learning model that is trained to analyze an images of hard drive media surfaces to detect and uniquely identify different abnormal surface pattern(s). Responsive to each pattern detection, the machine learning model generates an output including a select classification of a number of predefined classifications of abnormal surface patterns, wherein each of the predefined classifications is associated in system memory with a severity indicator. The defect inspection system automatically implements a corrective action when the severity indicator for the select condition satisfies a failure condition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTION OF THE DRAWINGS

FIG. 3 illustrates a table of exemplary information that may be input to a defect inspection system, such as that shown and described with respect to FIG. 1.

DETAILED DESCRIPTIONS

Figure 1:
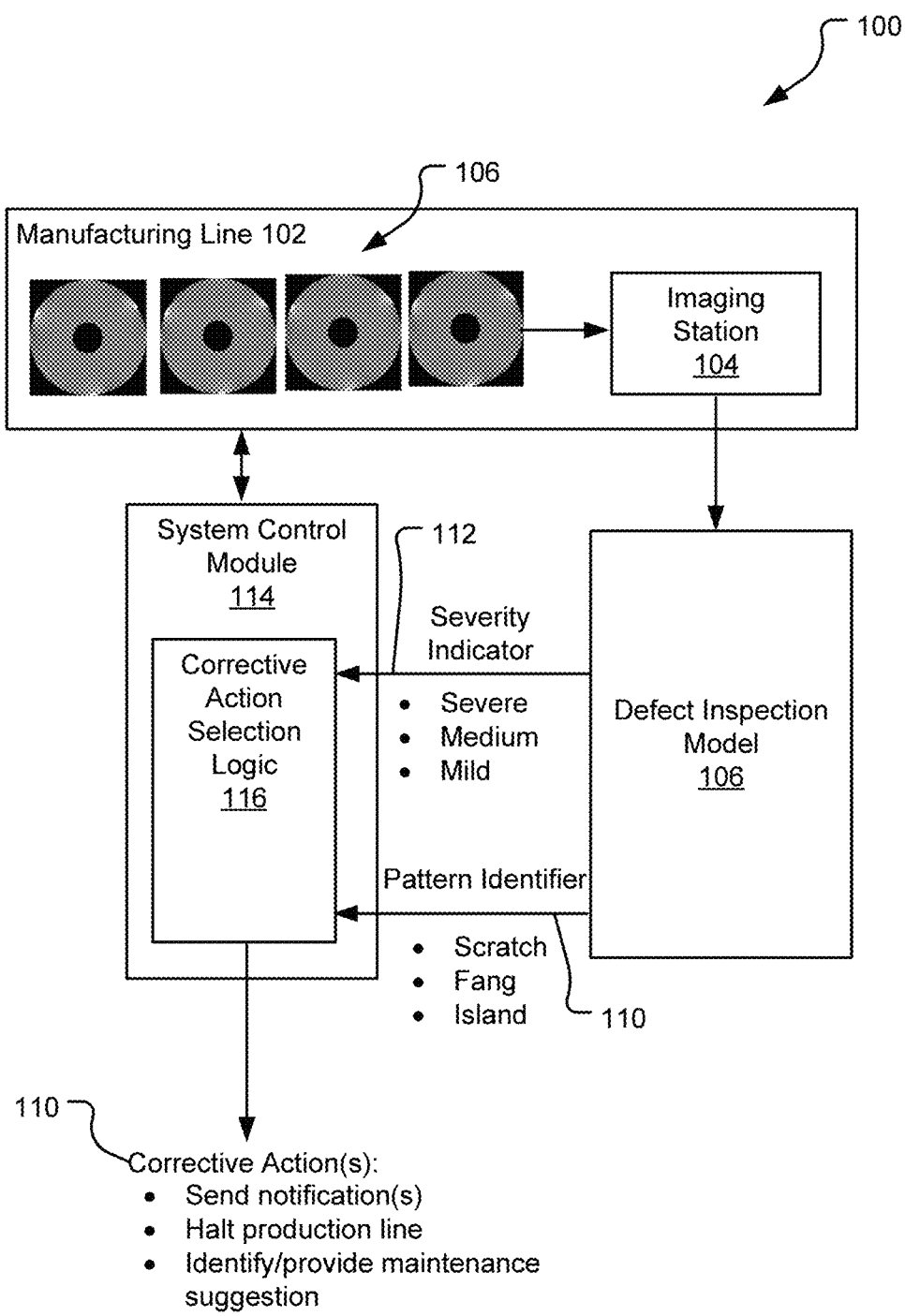
FIG. 1 illustrates an AI-trained defect inspection system that analyzes images of products on an assembly line to identify and classify abnormal surface patterns.

The technology disclosed herein provides an AI-vision-trained defect inspection system that facilitates dynamic (real-time) surface inspections of products on an assembly line. Although the disclosed technology could be adapted for detection of a variety of defects on different types of surfaces, the examples disclosed herein relate primarily to surface defects on storage media (magnetic disks) and more particularly, to defects that form in a lubricant layer on a magnetic media. For example, during the manufacturing of a magnetic disk, a hard topcoat may be deposited to protect underlying layers of magnetic material. This hard topcoat layer may be coated with a layer of lubricant that serves to protect the underlying layers and provide a uniform low-friction surface for the read/write head to glide across. Certain environmental conditions and mechanical issues (system misconfigurations, errors) that occur during manufacturing operations can cause a lack of uniformity in the lubricant layer, giving rise to various abnormal surface patterns in this layer. These abnormal surface patterns can, if severe enough, lead to collisions between the media and drive read/write elements as well as various other drive reliability issues.

In one implementation, a defect inspection system includes a laser-based imaging subsystem that directs light at the surface of a magnetic disk to capture a measurement of surface reflectivity. For example, the image captured may be Q-Phase image, which measures the phase difference between various polarization components in percent reflectivity. These or other types of images may be manually inspected by a human operator in an effort to detect abnormal surface patterns before such patterns affect a large number of products on an assembly line. However, human inspection is error-prone, as many abnormal surface patterns are faint and easily missed. Further, underlying layers can often present noise that may cause the human operator to mischaracterize the type of pattern present or the severity of it.

According to one implementation, a defect inspection model employs artificial intelligence to provide for more consistent, unbiased, and more timely detection of abnormal patterns on a surface of a product than that which is possible through inspections performed by a human operator. To ensure the trained model performs better than the human operator, a training set is developed using techniques that provide for mitigation of background noise (e.g., features in underlying layers), sample biasing mitigation, and comprehensive coverage of all patterns of interest at various stages of formation.

In some implementations, the training images input to the model are supplemented with a label characterizing a severity of the defect present in each image. This label is referred to herein as a "severity indicator." For example, some abnormal surface patterns may be more likely to cause a drive reliability issue than others. The severity indicator of these patterns may therefore indicate a "high severity" (e.g., a high priority in terms of addressing and fixing immediately). Patterns less likely to lead to drive reliability issues are referred to herein as having a low (or mild) severity indicator. For example, a pattern with a low severity indicator may be indicative of a low-priority problem for which a fix is possible but not imperative to ensure compliance with product quality control standards.

In various implementations, severity indicators supplementing training images may assume a variety of forms including numerical forms (e.g., 1-3 where '1' represents a most severe pattern), textual forms (e.g., "low", "moderate", "high") or in the form of a binary value or pass/fail condition (e.g., where a "pass" means the product may still pass inspection and "fail" means that the product fails inspection).

In the field of magnetic media, different types of abnormal surface patterns may be directly correlated with corresponding mechanical issues. For this reason, a defect inspection system may be trained to utilize predefined classifications of abnormal surface pattern(s) and/or their associated severity indicators to recommend or automatically implement particular corrective actions. Alternatively, these corrective actions may be selectively determined and implemented by a human operator based on defect classification that is identified by the defect inspection system. These and other implementations are discussed in greater detail with reference to the following figures.

FIG. 1 illustrates an AI-trained defect inspection system 100 that analyzes surface images of products on an assembly line to identify and classify abnormal surface patterns. When an abnormal surface pattern is detected, the AI-trained defect inspection system 100 may selectively implement one or more corrective action(s) designed to mitigate damage to the production line, such as by halting production processes, notifying operator(s), suggesting maintenance action(s), and//or automatically implementing a maintenance action (e.g., a calibration), The AI-trained defect inspection system 100 is shown to include a manufacturing line 102 with an imaging station 104 that includes a camera for imaging products on the manufacturing line 102. Although the herein disclosed technology may be applicable to defect inspection on a variety of types of assembly lines, the examples shown herein pertain to manufacturing processes for hard drive disks 106 (magnetic media). In this case, the manufacturing line 102 performs semiconductor manufacturing operations to form a layered magnetic structure on a glass substrate. The layered media may be coated with a hard protective topcoat layer and—finally, by a layer of lubricant that forms the final layer on the magnetic media. The lubricant layer is a protective layer that reduces frictional fluctuations on the disk surface, ensuring a smooth, low-friction interface between a read/write head and the disk.

When certain environmental factors and mechanical errors affect the lubricant application process, abnormal surface patterns may form in the lubricant layer. For example, vibrations, usual temperature gradients, and problems with application of the lubricant (e.g., lubricant is drained too fast or too slow) can cause certain abnormal surface patterns to form. If not caught and corrected for, these and other conditions may cause the same abnormal surface pattern to form on many (e.g., hundreds) of different disks. When disks with abnormal surface patterns are used in the field, the resulting drives may suffer reliability issues and be subject to frequent head/media crashes.

To help ensure that abnormal lubricant patterns are detected and caught early, the imaging station 104 captures real-time images of the hard drive disks 106 on the production line. In one implementation, the imaging station 104 used a laser-based measurement system that performs reflectivity measurements that make abnormal patterns easier to see than with the naked eye. For instance, the imaging station 104 may be a laser-based imaging system that captures a Q-phase image by measuring the phase different between the S-Polarization component and P-Polarization component in percent reflectivity. In different implementation, other imaging techniques may also be employed.

Notably, the lubricant layer is one of multiple examples of a layer that can be inspected using measurements of surface reflectivity. Within the same field of technology (magnetic disks), there also exist other layers that can be meaningfully inspected using measurements of surface reflectivity. For example, this same or similar imaging technique may be used to collect images for water mark inspection after disks are washed and/or to check for defects after undergoing a sputtering process. All of these processes may benefit from similar implementations of the herein disclosed defect imaging and detection technology.

Each image captured by the imaging station 104 is provided to a defect inspection model 106 for a defect inspection analysis. In one implementation, the defect inspection model is a machine learning model trained with supervised learning techniques to detect and identify different abnormal surface pattern.

In one implementation, the defect inspection model 106 implements a neural network that calculates a convolution layer between each input image and each of several filters representing different predefined patterns of interest. For each input image, the defection inspection module computes weights over a series of convolutions, where the weights indicate the relative similarity between the input image and each of the filters. When an image has a determined threshold level of similarity with one of the trained filters, the defect inspection model 106 outputs a pattern identifier that identifies the abnormal surface pattern that is associated with the filter. For example, the defect inspection model outputs a pattern identifier 110 that is among a plurality of different pattern identifiers used to train the defect inspection model 106. In one example, implementation, the defect inspection model is trained to identify several (e.g., 15-20) different classifications of abnormal surface patterns. By example and without limitation, FIG. 1 lists some of these patterns as "scratch," "fang", and "island." Exemplary characteristics of these and other abnormal surface patterns are discussed in greater detail below.

In some implementations, the defect inspection model 106 is also trained to output a severity indicator 112, which may assume forms the same or similar to those discussed above. For example, the severity indicator may indicate a "high" severity or a "failure" (e.g., to indicate a product inspection failure) when the detected surface pattern(s) has a pattern identifier that is pre-identified as likely to lead to a drive reliability issue.

The pattern identifier 110 and the severity indicator 112 output from the defect inspection model 106 provide sufficient information from which the system control module 114, or a human operator (not shown), can identify and implement effective troubleshooting actions with appropriate priority (e.g., based on the severity of each detected problem). In the particular system of FIG. 1, each of the pattern identifiers 110 used to train the model is associated with a known cause. For example, one pattern identifier may identify a pattern caused by excessive vibrations that occur when the disk is positioned at an incorrect angle within the lubricant chamber at the time the lubricant is applied. Other pattern identifier may identify a pattern caused by thermal shock when the disk is exposed to a larger-than-expected temperature gradient. Other pattern identifiers (also referred to herein as pattern classifications) are associated with other known causes.

Since each of the pattern identifiers may refer to a pattern associated with a known cause, some implementations of the AI-trained defect inspection system 100 may include logic for diagnosing a mechanical issue troubleshooting (e.g., suggesting or automatically performing troubleshooting actions) based on pattern identifier that is output by the defect inspection model 106. For example, each pattern identifier is associated in memory with a manufacturing error or an environmental condition that is preidentified as being likely cause or source of the abnormal surface pattern that formed. In some implementations, this stored information is selectively output by the AI-trained defect inspection system 100 when an abnormal surface pattern is detected to provide an operator or maintenance engineer with information that expedites diagnosis and correction of a system problem. For example, a first pattern identifier may be associated in memory with a "high" severity indicator, a descriptor indicating a likely source of the problem (e.g., "excessive vibrations") and/or a maintenance suggestion (e.g., "check disk tray alignment").

Responsive to identification of an abnormal surface pattern that has a severity indicator satisfying a failure condition (e.g., a moderate or high severity), the system control module 114 employs corrective action selection logic 116 to determine and/or implement one or more appropriate corrective actions. For example, the corrective action may provide for halting production (e.g., by turning off or pausing manufacturing operations). Alternatively, the corrective action may provide for sending a notification, such as an email, to a maintenance team or other system operator.

In still other implementations, the corrective action provides for display of a suggested maintenance troubleshooting action and/or automatic implementation of a such action. For example, the system control module 114 may utilize the pattern identifier output by the defect inspection model 106 to identify a potential cause of the problem giving rise to the pattern formation and/or to identify a maintenance suggestion or maintenance action that has been stored in memory in association with the pattern identifier. In implementations where the system control module 114 identifies maintenance/troubleshooting actions, the system may present the identified actions on a display, such that the presented action may serve as a suggestion for a maintenance team. In other implementations, the AI-trained defect inspection system 100 may automatically implement identified maintenance/troubleshooting actions.

The imaging station 104, defect inspection module 106, and system control module 114 may each comprise software, hardware, or a combination of hardware and software, where software may be understood as including computer-executable instructions stored in memory. For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, operating systems, applications, and the like that are accessed by a computer processor to perform the desired functionality. The term "memory" is defined herein to expressly exclude intangible computer-readable communication signals that embody computer readable instructions, data structures, program modules or other data resident in a modulated data signal, such as a carrier wave or other signal transport mechanism.

Figure 2:
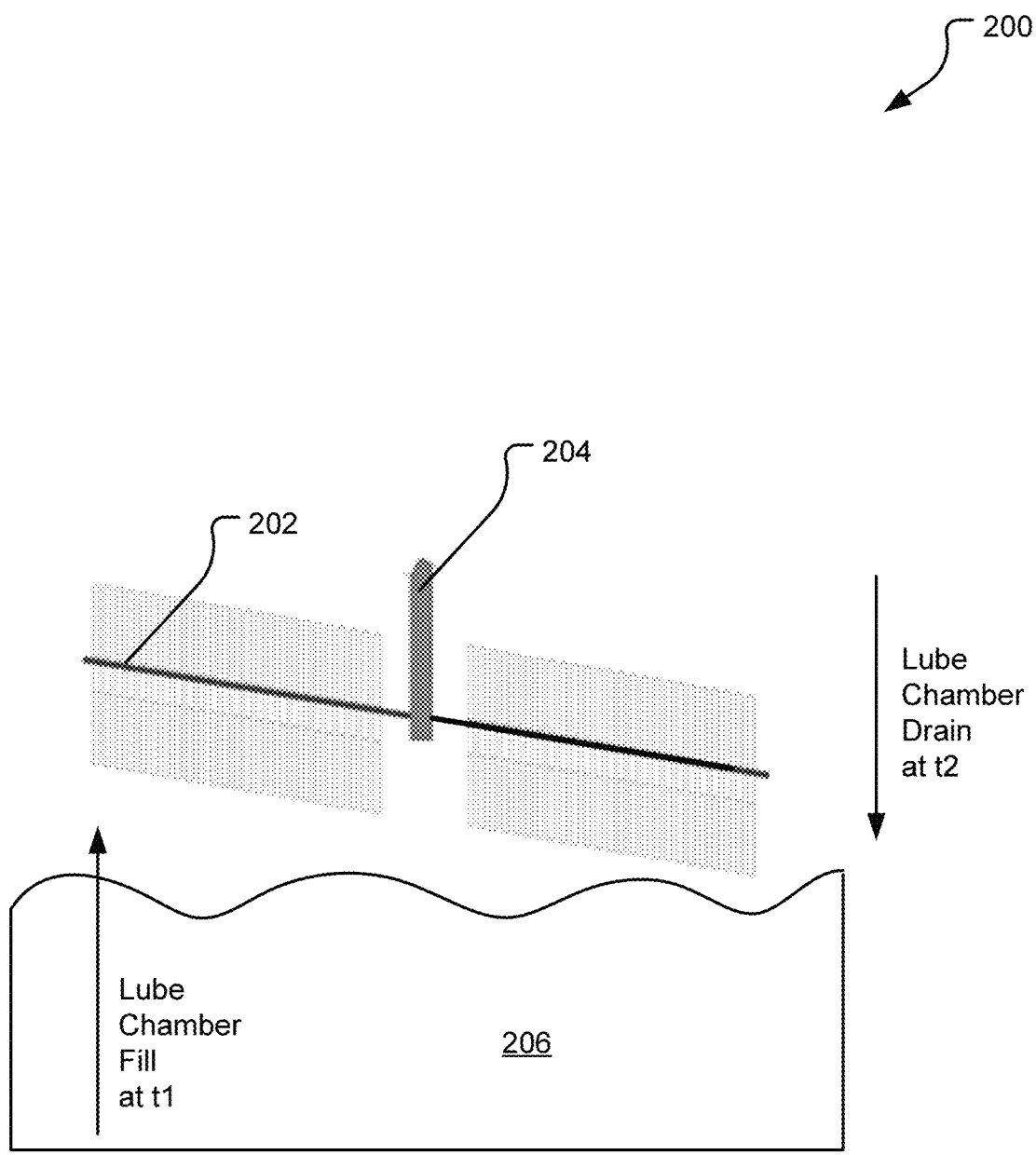
FIG. 2 illustrates aspects of an example storage media lubricant application process that may lead to formation of abnormal surface patterns that are detectable via the herein disclosed technology.

FIG. 2 illustrates aspects of an example lubricant application process 200 that may lead to abnormal surface patterns detectable via the herein disclosed technology. This process is shown and described to provide exemplary context illustrating how outputs from a defect inspection module could potentially provide information useful to guide system maintenance actions. By example and without limitation, FIG. 2 illustrates a side profile of a single magnetic disk 202 with a mandrel 204 supporting and holding the disk center. The magnetic disk 202 is shown to be positioned at an angle that is slightly non-perpendicular to a central axis of the mandrel 204 (e.g., 7 degrees from perpendicular). Although not shown, it may be understood that a lubricant machine is designed to receive a number of magnetic disks (e.g., 25 or more) stacked on the mandrel 204 in the manner shown with respect to the magnetic disk 202. Once the mandrel 204 is positioned within a chamber of the lubricant machine, a lube solution 206 is pumped into the chamber, filling the chamber from bottom to top, gradually submerging the disks. The lubricant solution may, for example, include a combination of lubricant and solvent.

Once the chamber is full, the magnetic disks are permitted to soak for a dwell period, which helps to ensure that the solution drains smoothly so as to prevent the formation of certain types of abnormal surface patterns. After the dwell period, the lubricant machine begins to drain the lubricant from the chamber. As the lubricant solution drains across the surface of each magnetic disk, the solvent evaporates, leaving behind a lubricant layer on each disk surface.

A majority of abnormal surface patterns that may potentially form in the lubricant layer may occur during the above-described fill/drain lubricant phases. Examples phases of the above process that can cause abnormal surface patterns to form include (1) solution temperature fluctuations that affect differences in the solvent evaporation rate; (2) uneven drain speed of the solvent that affect differences in the solvent evaporation rate; (3) machine vibrations during drainage that cause turbulence in the solution; (4) creating tension on the magnetic disks by draining the lubricant too fast; and (5) mispositioning or misaligning the disks on the mandrel 204 relative to a target angular position (e.g., if a 7 degree angle is targeted, an angle greater or less than 7 degrees can be problematic).

In summary, the lubricant applicant process is a delicate process that is sensitive to vibrations, turbulence, and temperature fluctuations. Minute shifts in these factors can lead to the formation of abnormal surface patterns that can cause head/media crashes during in-house testing or in-the-field failure if drives are distributed to consumers. Notably, some benign normal patterns may also form in the lubricant layer. The challenge is therefore to detect and halt production whenever abnormal surface patterns form while allowing production activities to continue undisturbed when normal patterns occur.

FIG. 3 illustrates a table 300 of exemplary information that may be used as inputs to a defect inspection system, such as that shown and described with respect to FIG. 1. Images 302 show exemplary abnormal surface patterns that may form as a result of different environmental factors and/or misconfigured settings that may influence the lubricant application process described with respect to FIG. 2.

A top row of the table 300 includes exemplary information about a pattern identifier: "island." The "island" pattern is characterized by a small island-like peak visible on one side of the media mid-way between inner and outer diameter. This particular feature is known to form due to excessive vibrations within the lubricant machine, such as those than may commonly occur when the disks are positioned on the mandrel (as discussed with respect to FIG. 2) at an improper angle and/or when foreign material is present in the lubricant tank. This type of pattern is known to lead to disk reliability problem and thus, the pattern identifier of "island" is associated with a high severity indicator "severe." In some implementations, a maintenance suggestion may be associated in memory with each of the pattern identifiers to convey a likely cause of the detected pattern and help an operator troubleshoot the issue. For example, in the case of the exemplary pattern identifier "island," the maintenance suggestion may read "Verify mandrel stem and angle" and/or "check lube tank for foreign materials."

The next row of the table 300 includes exemplary information about a pattern identifier known as "fang," which is characterized by two small scratches that appear generally parallel to one another on opposite sides of the disk center opening. This feature is known to form due to thermal shock. For example, if the disks are inserted into the lubricant machine at a time when they are too hot (e.g., have not sufficiently cooled from a prior process), the temperature-controlled chamber of the lubricant machine may cause a thermal shock on the disk surface that characteristically leaves this fang pattern. This type of pattern may also be caused when the lubricant drains to fast. "Fang" patterns are known to lead to disk reliability problems and thus, the pattern identifier "fang" is also associated with a high severity factor. A maintenance suggestion that may be potentially stored in association with the "fang" classification reads: "adjust/check machine temp settings" or "check drain speed and lube concentration."

The third row of the table 300 includes exemplary information about a pattern identifier known as "multiline," which refers to an arrangement of generally parallel lines that span the surface of the disk. This feature is known to form when there is a malfunction with the check valve or the pump, or when there is a filter blockage. Like island and fang patterns, the multiline pattern is also associated with a high severity factor. An exemplary maintenance suggestion for this figure may read: "check pump and filter efficiency" or "inspect check valve for solution backflow."

Notably, not all patterns shown in the table 300 are considered to be severe. The bottom two rows of the table identify pattern classifiers "puddle" and "scratch," both of which are associated with a mild severity indicator. Even these mild severity patterns may be associated with one or more likely "causes" of the pattern as well as one or more maintenance suggestions to remedy the error. The pattern identifiers shown in the table 300 illustrate just four of many potential patterns that may be detected and associated with known causes.

Figure 4:
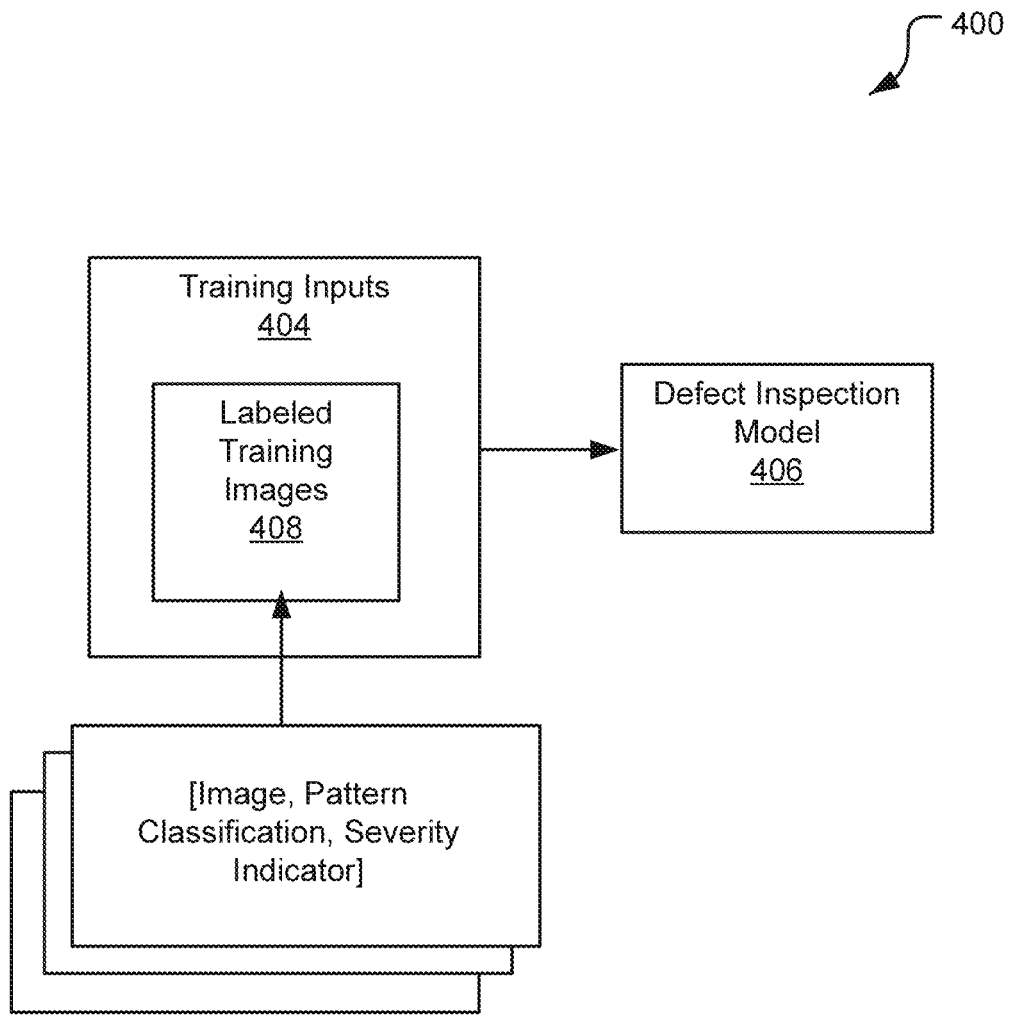
FIG. 4 illustrates a defect inspection system including a defect inspection model that implements a neural network trainable to identify abnormal surface patterns on a media surface.

FIG. 4 illustrates a defect inspection system 400 including a defect inspection model 406 that implements a neural network trainable to identify abnormal surface patterns on a media surface. The defect inspection model 406 may, in different implementations, be trained using various machine learning techniques including without limitation supervised learning, unsupervised learning, reinforcement learning, other techniques, or any combination therefore. The various machine learning technique(s) employed by the defect inspection model 406 may utilize learning from artificial neural networks of various types including without limitation convolutional neural networks, regions with convolutional neural networks (R-CNN), and recurrent neural networks. In one example implementation, the defect inspection model 406 is a pre-trained CNN model known as "Xception" that is re-purposed, using a transfer learning technique, to identify and classify abnormal surface patterns on a media surface. Other implementations may employ other techniques.

During a training stage, the defect inspection model 406 is provided with a set of training inputs 404 that include labeled training images 408. The labeled training images 408 include images of a surface of a product (such as the magnetic media described with respect to the imaging station of FIG. 1), where the images are labeled to further include a pattern identifier and a severity indicator. The pattern identifier indicates what, if any, type of abnormal surface pattern is present in the surface of the product within each image, while the severity indicator indicates a predefined severity of the pattern class identified by the pattern identifier.

The defect inspection model 406 uses the training inputs 404 associated with each different pattern identifier to define an associated one of multiple different filters. After a sufficient number of the training inputs 404 are provided in association with each of the different pattern identifiers, the accuracy of the model may be tested. Following testing, the set of training inputs 404 may be refined (added to and/or modified) to assess the accuracy of the model, until the accuracy satisfies a threshold degree of reliability.

Figure 5:
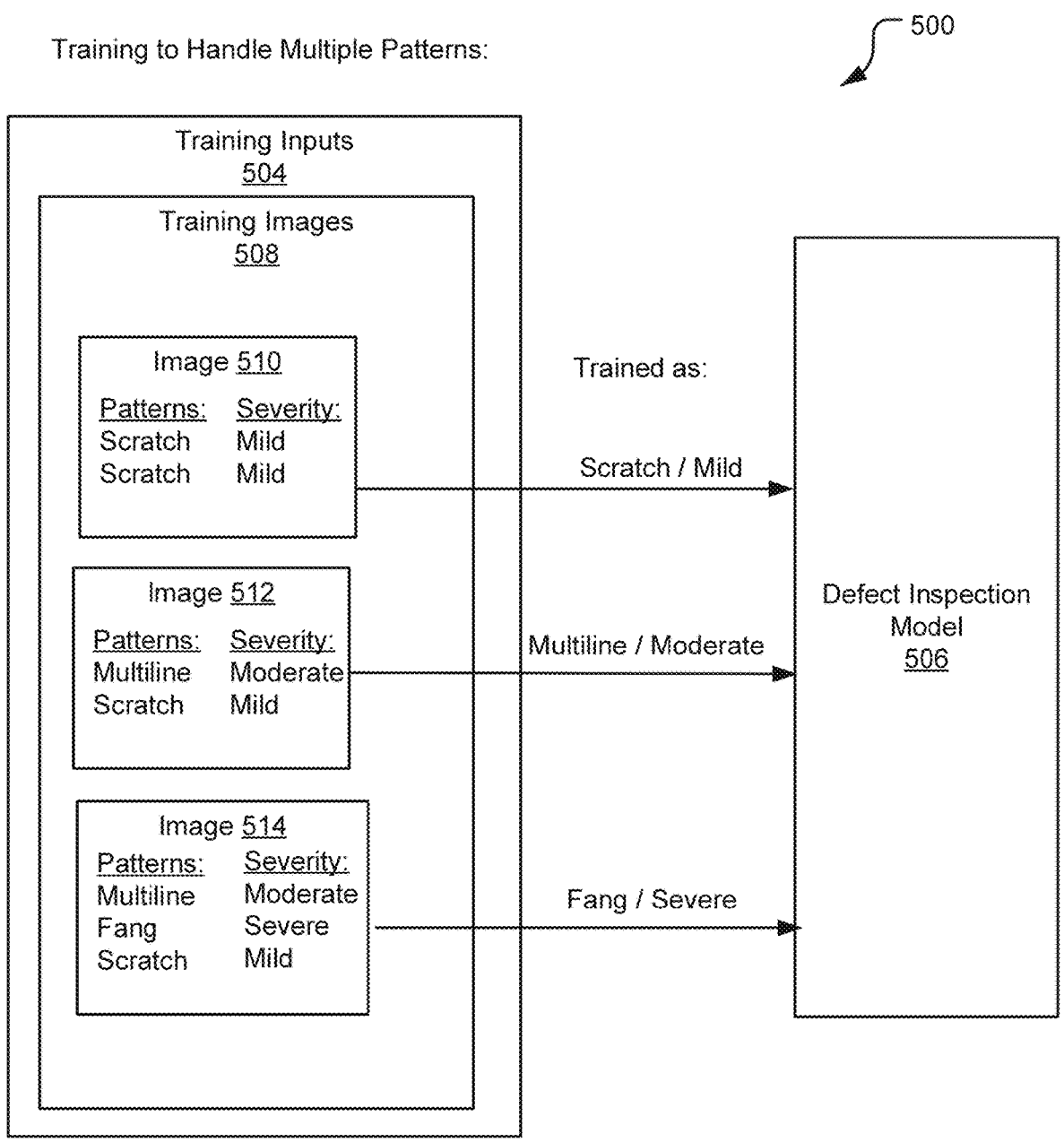
FIG. 5 illustrates exemplary training inputs of another defect inspection system.

FIG. 5 illustrates aspects of another defect inspection system 500 including in a defect inspection model 506 that receives exemplary training inputs 504. The defect inspection model 506 may include the same or similar characteristics to those described elsewhere herein. As with the training inputs shown and described with respect to FIG. 4, the training inputs 504 include training images 508, which may be labeled to include a pattern identifier identifying a particular type of abnormal surface pattern and a severity indicator indicating a relative priority/severity of the problem(s) caused by the abnormal surface pattern.

In the example illustrated, the training inputs 504 include some images that depict two or more abnormal surface patterns such that the full set of training images 508 is representative of the set of possible combinations of patterns that may appear on the products being inspected. By example and without limitation, the training images 510, 512, and 514 each include multiple different abnormal surface patterns, some of which have varying degrees of severity.

According to one implementation, each of the images 510, 512, 514 is input to the defect inspection model 506 with a singular set of labels representative of a most severe one of the multiple abnormal surface patterns present in the image. For example, the image 510 includes two different instances of the pattern "scratch," which has a "mild" severity indicator. In this case, the image 510 is labeled with a single pattern identifier (e.g., "scratch") and a single severity indicator (e.g., "mild"). Thus, the defect inspection model 506 receives a single pattern identifier and severity indicator for the images 510 despite the fact that image 510 actually contains multiple patterns In contrast to the image 510, the image 512 includes one instance of the pattern "scratch" (of mild severity) and one instance of the pattern "multiline," which is of moderate severity. Since the multiline pattern has the higher severity indicator, the image 512 is labeled as "multiline" with a "moderate" severity indicator and input to the defect inspection model 506. The third exemplary image, image 514, includes three different patterns: multiline, fang, and scratch that have corresponding severity indicators "moderate," "severe," and "mild," respectively. In this case, the image 514 is labeled as "fang" with the "severe" severity indicator and input to the defect inspection model 506.

In another implementation, images with multiple abnormal surface patterns such as 510, 512, and 514 are input to the defect inspection model 506 with multiple sets of labels—one corresponding to each pattern present. However, the defect inspection system 500 be configured to automatically implement corrective actions based on the most severe pattern that is recognized. If, for example, the defect inspection model 506 recognizes both "scratch" (with severity indicator "mild") and "fang" (with severity indicator "severe") in a single image, the defect inspection system 500 selects the pattern with the higher severity indicator (e.g., fang) and determines which corrective action(s) to implement based on this more severe pattern. Here, the defect inspection system 500 may, for example, detect multiple patterns and outputs a list of all of the detected patterns to a display. The most severe pattern detected may be displayed first or with some level of emphasis, and the defect inspection system 500 may take corrective actions that are associated with the most severe pattern.

Figure 6:
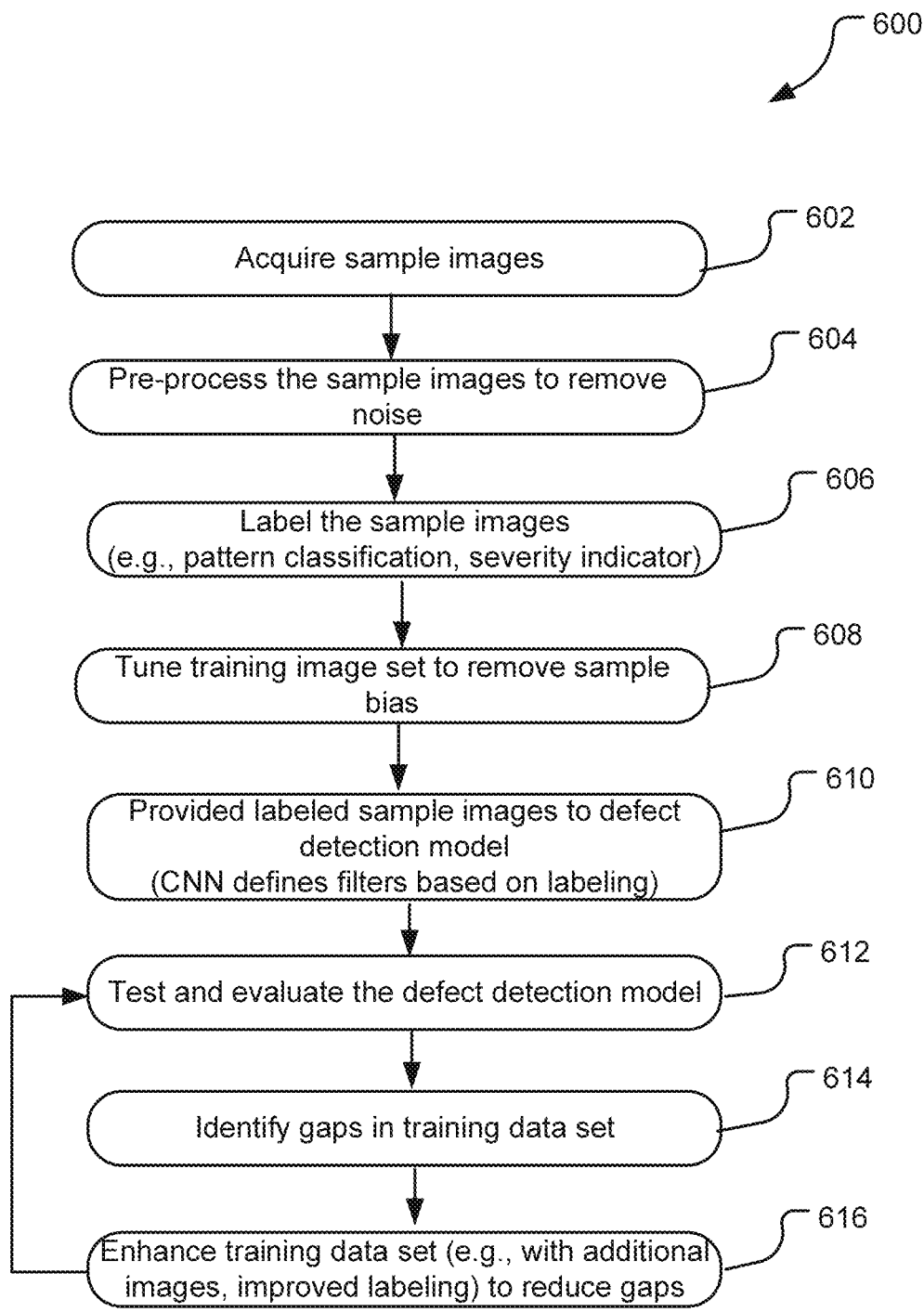
FIG. 6 illustrates example operations for training a defect inspection module.

FIG. 6 illustrates example operations 600 for training a defect inspection module to perform actions the same or similar to those discussed above with respect to FIG. 1. An acquisition operation 602 acquires a set of sample images of a magnetic disks, such as via an imaging station that generates images based on measurements of surface reflectivity, as described above with respect to the imaging station 104 of FIG. 1. In one implementation, the sample images of the magnetic disks are captured immediately following application of a lubricant layer, as described above.

An image pre-processing operation 604 pre-processes the sample images to remove noise. Notably, layers of the magnetic disk underlying the lubricant layer can sometimes affect surface reflectivity and therefore contribute noise to patterns captured in the image(s) that form in the lubricant layer. According to one implementation, this "underlayer" noise is minimized by applying a one-dimensional Gaussian Filter to each image to obtain noise-only image. This noise-only image is then subtracted from the source (sample) image to obtain an enhanced image without noise.

A labeling operation 606 labels the enhanced (noise-subtracted) sample images. In one implementation, this labeling operation 606 is effective to annotate each of the sample images with a surface pattern identifier, which be null in cases where no surface pattern is present. For example, a human operation may identify pattern(s) and their associated pattern identifiers from a predefined classification set. In one implementation, predefined classification set consists of 16 different types of pattern identifiers, such as those example pattern identifiers shown and described with respect to FIG. 3.

The labeling operation 606 may also entail labeling each of the sample images with an abnormal surface pattern (e.g., one of the predefined classifications) with a severity indicator. This may be performed on a per-image basis or, alternatively, the defect inspection module may be pre-loaded with logic that allows a mapping to be obtained between a pattern identifier (e.g., included in the training inputs) and a corresponding severity indicator.

Following the labeling operation of all sample images, a tuning operation 608 performs further operations to remove sample bias from the training dataset. In one implementation, abnormal surface patterns characteristically occur in the lubricant layer in a small percentage of all images (e.g., <0.5%). Since any comprehensive dataset collected in a given time period leads to so few representative images with abnormal surface patterns, the use of such data set to train a model may introduce a sample bias that reduces accuracy of the model. According to one implementation, the tuning operation 608 provides for increasing a representing number of images in the training dataset that have abnormal surface patterns and also for ensuring that the training data has sufficient coverage of pattern identifiers of interest. Notably, some abnormal surface patterns may change at different phases of formation. Therefore, ensuring sufficient coverage of a particular abnormal surface pattern may entail ensuring that the training set includes sample images corresponding to all different phases of pattern formation.

A providing operation 610 provides the training data set to the untrained defect inspection model (e.g., a CNN). The untrained defect inspection model then, in turn, defines filters (a weight matrix) based on the labeling scheme and based on the features present in each input image. A testing operation 612 tests and evaluates the trained defect detection model by providing one or more test images as input and checking to verify that the classification(s) output by the model match the actual classifications of the image(s).

Based on the outcome of the testing operation 612, an identification operation 614 identifies gaps in the training dataset. For example, the identification operation 614 may determine that there exists inadequate coverage of a particular pattern identifier, causing the trained model to frequently misclassify images having patterns associated with that pattern identifier. Based on the identification operation 614, an enhancing operation 616 may perform actions to enhance the training data set, such as with additional images or modified labeling, to reduce the gaps in coverage. Operations 612, 614, and 616 may be repeated until the model attains an accuracy satisfying a predefined threshold.

Figure 7:
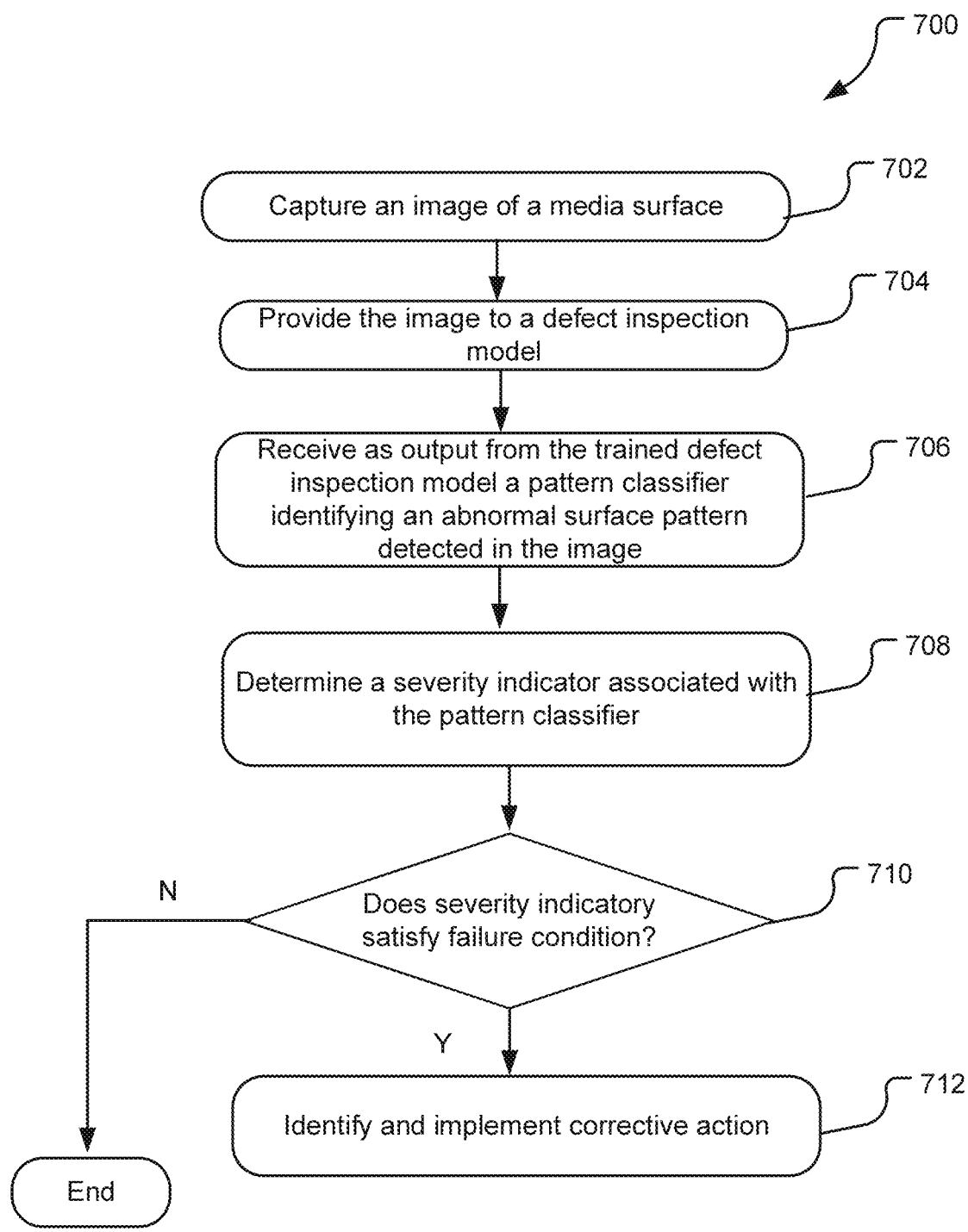
FIG. 7 illustrates example operations for using a trained defect detection model to detect an abnormal surface pattern present on the magnetic media and to selectively implement corrective actions based on the type and/or on the severity of the type.

FIG. 7 illustrates example operations 700 for using a trained defect detection model to detect a type (pattern identifier) of an abnormal surface pattern present on the magnetic media and to selectively implement corrective actions based on the type and/or on the severity of the type. An image capture operation 702 captures an image of media surface. In one implementation, the image is a Q-phase image (as described elsewhere herein) that provides a measurement of surface reflectivity. A provisioning operation 704 provides the captured image to a defect inspection model that has been trained to classify abnormal surface patterns as described with respect to any other figures herein. A receiving operation 706 receives as output from the defect inspection model a pattern identifier that identifies a pattern identifiers of a predefined number of such classifications identifying different types of abnormal surface patterns.

A determining operation 708 determines a severity indicator associated with the pattern identifier. In one implementation, the severity indicator is output from the model along with the pattern identifier. For example, the severity indicator may be conveyed as a pass/fail status, where "pass" is associated with certain abnormal surface patterns that are not known to cause head/media crash or disk reliability issues. Alternatively, the severity indicator may be output as a "high" or "low" priority, which may help a maintenance engineer or operator how critical it is to identify and troubleshoot the mechanical issues that caused the identified pattern. In some implementations, the severity indicator is not directly output from the defect inspection model but is determined by other automated processes of the larger defect inspection system. For example, a software module may query a table or database with the pattern identifier and retrieve the severity indicator that is stored in association with the pattern identifier.

A determination operation 710 determines whether the severity indicator satisfies a failure condition. A failure condition may, for example, imply that the imaged disk fails the inspection and is unfit for use in a storage media. In some implementations, the severity indicator may directly indicate whether or not the failure condition is satisfied (e.g., conveyed as a pass/fail label or flag). In other implementations, the defect inspection system may define a condition for failure that is based on one or both of the severity indicator and the pattern indicator. For example, a severity indicator of "moderate" or "high" satisfies the failure condition.

When the failure condition is not satisfied, no further action is taken by the system. When, however, the failure condition is satisfied, a corrective action identification and implementation operation 712 automatically implements a corrective action. For example, the corrective action may provide for transmitting a notification (e.g., an email, text message) or provide for shut-down (halt) of the manufacturing line. In some implementations, the corrective action provides for displaying a system maintenance action or providing other information about a likely source of the abnormal surface pattern. For example, the corrective action may include transmitting or displaying information that is suggestive of an environmental source (e.g., vibration, temperature) or system condition (e.g., angular misalignment) that aided formation of the abnormal surface pattern. Some implementations may also provide for automatic implementation of a maintenance action identified based on the pattern identifier. For example, the system may automatically adjust a setting (e.g., temperature, lubricant drainage speed) in an effort to troubleshoot the issue that caused the identified abnormal surface pattern.

Notably, some implementations may provide for multiple corrective actions depending on the severity and/or type of pattern detected. For example, a pattern identifier associated with a "mild" or "moderate" severity indicator may cause the system to send a notification alerting operator(s) while a pattern identifier associated with a "severe" severity indicator may cause the system to send a notification and take additional action, such as by halting the manufacturing line automatically and/or displaying certain relevant information to screens being monitored during production operations.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
providing an image of a hard drive media to a defect inspection model trained to identify predefined classifications of abnormal surface patterns, each of the predefined classifications of abnormal surface patterns being associated in memory with a severity indicator and indicative of a different type of manufacturing error;
receiving, from the defect inspection model, an output indicating that the image includes a pattern consistent with a select classification of the predefined classifications of abnormal surface patterns;
identifying a type of manufacturing error that caused the abnormal surface pattern to form; and
automatically implementing a corrective action when the severity indicator for the select classification satisfies a failure condition, the corrective action including presenting, on a user interface, one or both of the manufacturing error and a maintenance suggestion to remedy the identified type of manufacturing error.

2. The method of claim 1, wherein the output from the defect inspection model includes a label identifying the select classification of abnormal surface pattern detected in the image.

3. The method of claim 2, wherein the output further includes the severity indicator.

4. The method of claim 1, wherein the method further comprises:
selecting the corrective action to implement based on the severity indicator.

5. The method of claim 1, wherein the corrective action includes transmitting a control signal to automatically halt a process performed as part of a manufacturing assembly line.

6. The method of claim 1, wherein the corrective action includes transmitting a notification to a human operator.

7. The method claim 1, wherein the image is a Q-phase image representing a reflectivity difference between two different polarization components of light interacting with the surface of the hard drive media.

8. A system comprising:
an imaging device configured to capture an image of a surface of a hard drive media;
a defect inspection model that receives the image as input, the defect inspection model being trained to identify predefined classifications of abnormal surface patterns, each of the predefined classifications being associated in memory with a severity indicator and indicative of a different type of manufacturing error;
a system control module that:
receives an output from the defect inspection model, the output indicating that the image includes a pattern consistent with a select classification of the predefined classifications of abnormal surface patterns;
identifies a type of manufacturing error that caused the abnormal surface pattern to form; and
automatically implements a corrective action when the severity indicator for the select classification satisfies a failure condition, the corrective action including presenting, on a user interface, at least one of the identifying manufacturing error and a maintenance suggestion to remedy the identified manufacturing error.

9. The system of claim 8, wherein the output from the defect inspection model includes a label identifying the select classification of abnormal surface pattern detected in the image.

10. The system of claim 9, wherein the output further includes the severity indicator.

11. The system of claim 8, wherein system control module is further configured to:
select the corrective action to implement based on the severity indicator.

12. The system of claim 8, wherein the corrective action includes transmitting a control signal to automatically halt a process performed as part of a manufacturing assembly line.

13. The system of claim 8, wherein the corrective action includes transmitting a notification to a human operator.

14. The system of claim 8, wherein the image is a Q-phase image representing a reflectivity difference between two different polarization components of light interacting with the surface of the hard drive media.

15. One or more memory devices encoding computer executable instructions for executing a computer process comprising:

provic an image of a media surface to a defect inspection model, the defect inspection model trained to identify predefined classifications of abnormal surface patterns on the media surface, each of the predefined classifications being associated in memory with a severity indicator and indicative of a different type of manufacturing error;

receiving, from the defect inspection model, an output indicating that the image includes a pattern consistent with a select classification of the predefined classifications of abnormal surface patterns;

identifying, based on the output, a type of manufacturing error that caused the abnormal surface pattern to form; and presenting, on a user interface, at least one of the identifying manufacturing error and a maintenance suggestion to remedy the identified manufacturing error.

16. The one or more memory devices of claim 15, wherein the output from the defect inspection model includes a label identifying the select classification of abnormal surface pattern detected in the image.

17. The one or more memory devices of claim 15, wherein the output further includes the severity indicator.

18. The one or more memory devices of claim 15, wherein the computer process further comprises:

selecting the corrective action to implement based on the severity indicator.

\* \* \* \* \*